(12) United States Patent
Costin et al.

(10) Patent No.: US 8,050,841 B2
(45) Date of Patent: Nov. 1, 2011

(54) SECURITY FOR ENGINE TORQUE INPUT AIR-PER-CYLINDER CALCULATIONS

(75) Inventors: Mark H. Costin, Bloomfield Township, MI (US); Timothy J. Hartrey, Brighton, MI (US); Layne K. Wiggins, Plymouth, MI (US); Bryan D. Lehman, Fenton, MI (US); Roberto De Paula, New Hudson, MI (US); Joseph M. Stempnik, Warren, MI (US)

(73) Assignee: GM Global Technology Operations LLC

( * ) Notice: Subject to any disclaimer, the term of this patent is extended or adjusted under 35 U.S.C. 154(b) by 606 days.

(21) Appl. No.: 12/254,926

(22) Filed: Oct. 21, 2008

(65) Prior Publication Data
US 2009/0292435 A1 Nov. 26, 2009

Related U.S. Application Data

(60) Provisional application No. 61/054,914, filed on May 21, 2008.

(51) Int. Cl.
*G06F 7/00* (2006.01)

(52) U.S. Cl. .......... 701/84; 701/103; 701/115; 123/399; 123/90.17; 123/90.15; 123/90.31

(58) Field of Classification Search .................. 701/103, 701/115, 102; 123/399, 90.17, 90.15, 90.31
See application file for complete search history.

(56) References Cited

U.S. PATENT DOCUMENTS
2009/0118968 A1* 5/2009 Livshiz et al. ................ 701/102
* cited by examiner

*Primary Examiner* — Behrang Badii (57) ABSTRACT

An air-per-cylinder (APC) security system for a vehicle comprises an APC determination module, an APC threshold determination module, and an APC diagnostic module. The APC determination module determines first and second APC values for first and second cylinders of an engine, respectively, based on mass airflow (MAF) into the engine. The APC threshold determination module determines an APC threshold based on the first APC value and a spark timing for the first cylinder. The APC diagnostic module selectively diagnoses a fault in the APC determination module when the second APC value is greater than a sum of the first APC value and the APC threshold.

22 Claims, 4 Drawing Sheets

SECURITY FOR ENGINE TORQUE INPUT AIR-PER-CYLINDER CALCULATIONS

CROSS-REFERENCE TO RELATED APPLICATIONS

This application claims the benefit of U.S. Provisional Application No. 61/054,914, filed on May 21, 2008. The disclosure of the above application is incorporated herein by reference in its entirety.

FIELD

The present disclosure relates to control of internal combustion engines and more particularly to engine control systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Airflow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders. Increasing the air and fuel to the cylinders increases the torque output of the engine.

Engine control systems have been developed to control engine torque output to achieve a desired torque. Traditional engine control systems, however, do not control the engine torque output as accurately as desired. Further, traditional engine control systems do not provide as rapid of a response to control signals as is desired or coordinate engine torque control among various devices that affect engine torque output.

SUMMARY

An air-per-cylinder (APC) security system for a vehicle comprises an APC determination module, an APC threshold determination module, and an APC diagnostic module. The APC determination module determines first and second APC values for first and second cylinders of an engine, respectively, based on mass airflow (MAF) into the engine. The APC threshold determination module determines an APC threshold based on the first APC value and a spark timing for the first cylinder. The APC diagnostic module selectively diagnoses a fault in the APC determination module when the second APC value is greater than a sum of the first APC value and the APC threshold.

In other features, the first cylinder is a next cylinder to be fired in a firing order and the second cylinder is to be fired after the first cylinder.

In still other features, the APC threshold determination module determines the APC threshold further based on a derivative of an estimated torque output of the engine with respect to APC.

In further features, the APC diagnostic module increments a timer when the second APC value is greater than the sum.

In still further features, the APC security system further comprises an APC storage module. The APC diagnostic module sets the first APC value in at least one predetermined location in the APC storage module.

In further features, the APC diagnostic module limits the first APC value before setting the first APC value in the APC storage module when the timer is greater than a first period.

In still further features, the APC diagnostic module limits the first APC value based on the second APC value.

In other features, the APC diagnostic module diagnoses the fault when the timer is greater than a second period, wherein the second period is greater than the first period.

In still other features, the APC diagnostic module decrements the timer when the second APC value is less than or equal to the sum.

In further features, the APC security system further comprises a diagnostic enabling module. The diagnostic enabling module one of enables and disables the APC diagnostic module based on an engine speed.

In further features, the diagnostic enabling module disables the APC diagnostic module when the engine speed is less than a speed threshold.

A method for an air-per-cylinder (APC) system of a vehicle comprises determining first and second APC values for first and second cylinders of an engine, respectively, based on mass airflow (MAF) into the engine, determining an APC threshold based on the first APC value and a spark timing for the first cylinder, and selectively diagnosing a fault in the first APC value when the second APC value is greater than a sum of the first APC value and the APC threshold.

In other features, the first cylinder is a next cylinder to be fired in a firing order and the second cylinder is to be fired after the first cylinder.

In still other features, the method further comprises determining the APC threshold further based on a derivative of an estimated torque output of the engine with respect to APC.

In further features, the method further comprises incrementing a timer when the second APC value is greater than the sum.

In still further features, the method further comprises setting the first APC value in at least one predetermined location.

In other features, the method further comprises limiting the first APC value before the setting when the timer is greater than a first period. In further features, the limiting comprises limiting the first APC value based on the second APC value.

In still other features, the selectively diagnosing comprises diagnosing the fault when the timer is greater than a second period, wherein the second period is greater than the first period.

In further featured, the method further comprises decrementing the timer when the second APC value is less than or equal to the sum.

In still further features, the method further comprises one of enabling and disabling the diagnosing based on an engine speed. In further features, the one of enabling and disabling comprises disabling the diagnosing when the engine speed is less than a speed threshold.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

An air-per-cylinder (APC) determination module determines first and second APC values for first and second cylinders of an engine, respectively. The APC determination module determines the first and second APC values based on mass airflow (MAF) into the engine. An engine controller uses the first APC to estimate torque output of the engine and may adjust one or more engine parameters based on the estimated torque.

An APC diagnostic module selectively diagnoses faults in the APC determination module based on an APC threshold and the first and second APCs. More specifically, the APC diagnostic module selectively diagnoses faults in the APC determination module when the second APC is greater than a sum of the first APC and the APC threshold.

Figure 1:
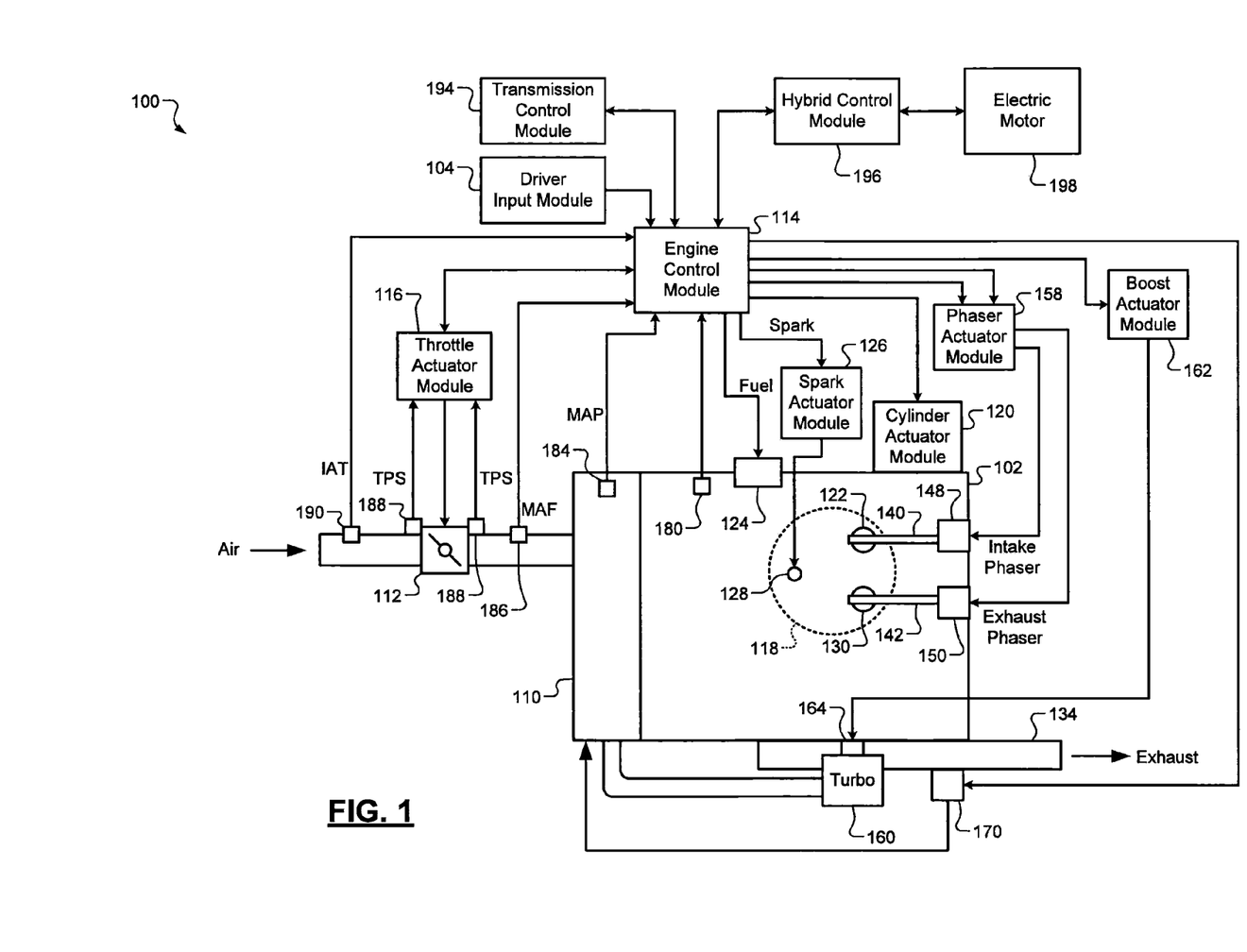
FIG. 1 is a functional block diagram of an exemplary engine system according to the principles of the present disclosure.

Referring now to FIG. 1, a functional block diagram of an exemplary engine system 100 is presented. The engine system 100 includes an engine 102 that combusts an air/fuel mixture to produce drive torque for a vehicle based on driver inputs provided by a driver input module 104. Air is drawn into an intake manifold 110 through a throttle valve 112. An engine control module (ECM) 114 provides commands to a throttle actuator module 116 to regulate opening of the throttle valve 112 to control the amount of air drawn into the intake manifold 110.

Air from the intake manifold 110 is drawn into cylinders of the engine 102. While the engine 102 may include multiple cylinders, for illustration purposes only, a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate one or more of the cylinders to improve fuel economy.

Air from the intake manifold 110 is drawn into the cylinder 118 through an associated intake valve 122. The ECM 114 controls the amount of fuel injected by a fuel injection system 124. The fuel injection system 124 may inject fuel into the intake manifold 110 at a central location or may inject fuel into the intake manifold 110 at multiple locations, such as near the intake valve of each of the cylinders. Alternatively, the fuel injection system 124 may inject fuel directly into the cylinders.

The injected fuel mixes with the air and creates the air/fuel mixture. A piston (not shown) within the cylinder 118 compresses the air/fuel mixture. Based upon a signal from the ECM 114, a spark actuator module 126 energizes a spark plug 128 associated with the cylinder 118, which ignites the air/fuel mixture. The timing of the spark may be specified relative to the time when the piston is at its topmost position, referred to as to top dead center (TDC), the point at which the air/fuel mixture is most compressed.

The combustion of the air/fuel mixture drives the piston down, thereby driving a rotating crankshaft (not shown). The piston then begins moving up again and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts may control multiple intake valves per cylinder and/or may control the intake valves of multiple banks of cylinders. Similarly, multiple exhaust camshafts may control multiple exhaust valves per cylinder and/or may control exhaust valves for multiple banks of cylinders. The cylinder actuator module 120 may deactivate cylinders by halting provision of fuel, spark, and/or disabling the cylinders exhaust and/or intake valves.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 controls the intake cam phaser 148 and the exhaust cam phaser 150 based on signals from the ECM 114.

The engine system 100 may also include a boost device that provides pressurized air to the intake manifold 110. For example, the boost device may include a turbocharger 160, as shown in FIG. 1. The turbocharger provides a compressed air charge to the intake manifold 110. The turbocharger 160 may be powered by, for example, exhaust gases flowing through the exhaust system 134. The air used to produce the compressed air charge may be taken from the intake manifold 110 and/or any other suitable source.

A wastegate 164 may allow exhaust gas to bypass the turbocharger 160, thereby reducing the turbocharger's output (or boost). The ECM 114 controls the turbocharger 160 via a boost actuator module 162. The boost actuator module 162 may modulate the boost of the turbocharger 160 by controlling the position of the wastegate 164.

Alternate engine systems may include a supercharger that provides compressed air to the intake manifold 110 and is driven by the crankshaft. The engine system 100 may also include an exhaust gas recirculation (EGR) valve 170, which selectively redirects exhaust gas back to the intake manifold 110 based on an EGR signal from the ECM 114.

The engine system 100 includes various sensors that each measure an engine parameter. For example, the engine system 100 includes an engine speed sensor 180 that measures engine speed in revolutions per minute (rpm). The engine speed sensor 180 may measure the engine speed, for example, based on the rotational speed of the crankshaft. The engine system 100 also includes a manifold absolute pressure (MAP) sensor 184, a mass airflow (MAF) sensor 186, a throttle position sensor (TPS) 188, an intake air temperature (IAT) sensor 190, and/or any other suitable sensor.

The MAP sensor 184 measures the pressure within the intake manifold 110. In various implementations, engine vacuum may be measured, where engine vacuum is the difference between ambient air pressure (i.e., barometric pressure) and the pressure within the intake manifold 110. The MAF sensor 186 measures mass flow rate of air through the throttle valve 112. One or more throttle position sensors, such as the TPS 188, measure the position of the throttle valve 112. The IAT sensor 190 measures the temperature of the air being drawn into the intake manifold 110. The ECM 114 may use signals from the various sensors to make control decisions for the engine system 100.

The ECM 114 may also communicate with a transmission control module 194 to coordinate shifting gears in a transmission (not shown). For example, the ECM 114 may reduce torque during a gear shift. The ECM 114 may also communicate with a hybrid control module 196 to coordinate operation of the engine 102 and an electric motor 198. The electric motor 198 may also function as a generator, and may be used to produce electrical energy for use by vehicle electrical systems and/or for storage in a battery. In various implementations, the ECM 114, the transmission control module 194, and the hybrid control module 196 may be integrated into one or more modules.

Figure 2:
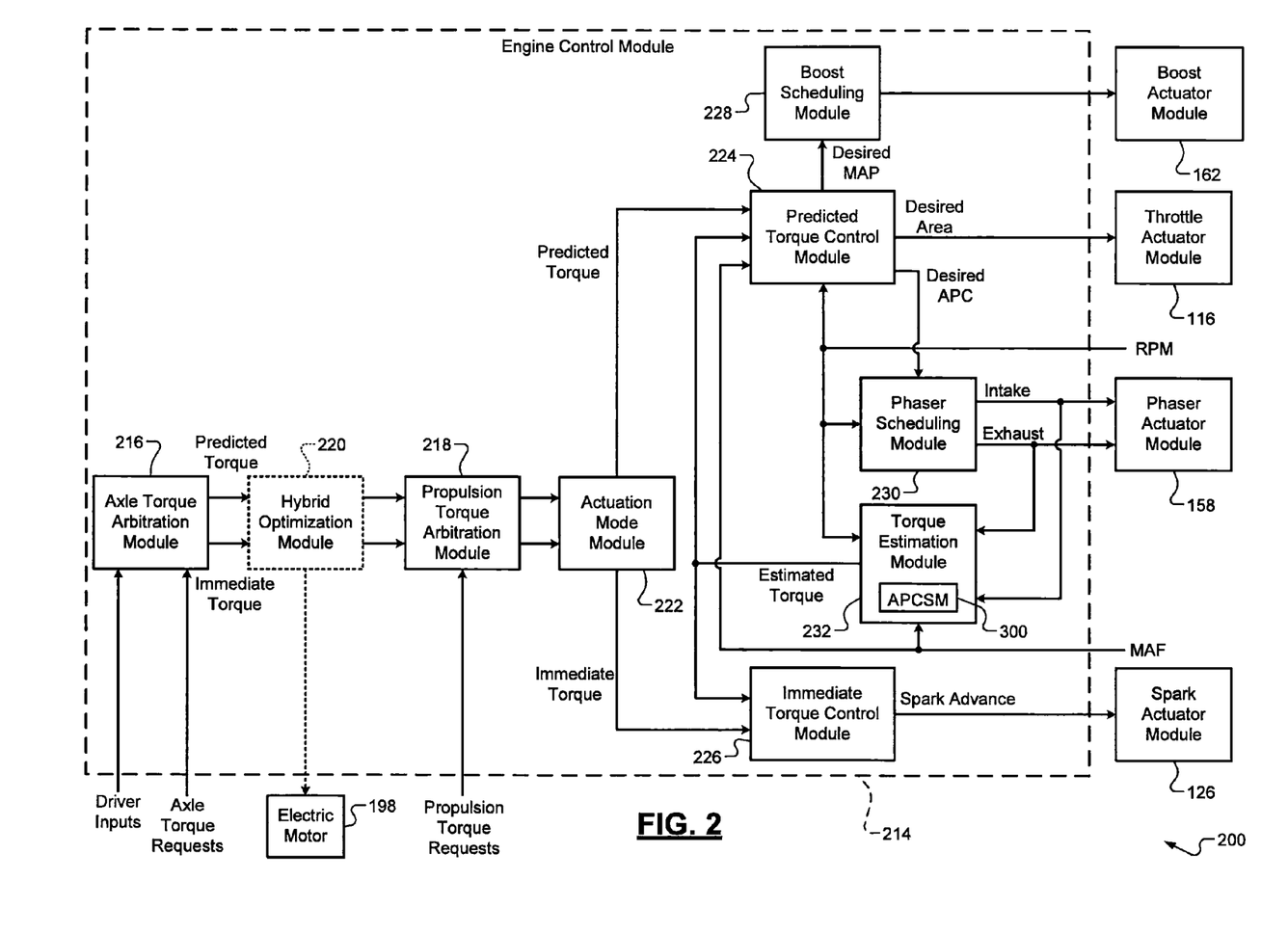
FIG. 2 is a functional block diagram of an exemplary engine control system according to the principles of the present disclosure.

Referring now to FIG. 2, a functional block diagram of an exemplary engine control system 200 is presented. An engine control module (ECM) 214 includes an axle torque arbitration module 216. The axle torque arbitration module 216 arbitrates between driver inputs from the driver input module 104 and other axle torque requests. For example, the driver inputs may include accelerator pedal position. Other axle torque requests may include a torque reduction requested during a gear shift, a torque reduction requested during wheel slip, and a torque request to control vehicle speed.

The axle torque arbitration module 216 outputs a predicted torque and an immediate torque. The predicted torque is the amount of torque that will be required in the future to meet the driver's torque and/or speed requests. The immediate torque is the torque required at the present moment to meet temporary torque requests, such as torque reductions requested for shifting gears or wheel slippage.

The immediate torque may be achieved using engine actuators that respond quickly, while slower engine actuators are targeted to achieve the predicted torque. For example, the spark timing may be adjusted relatively quickly using the spark actuator module 126, while the cam phaser angles and the throttle position may be slower to respond. The axle torque arbitration module 216 outputs the predicted torque and the immediate torque to a propulsion torque arbitration module 218.

In various implementations, such as hybrid vehicles, the axle torque arbitration module 216 may output the predicted torque and the immediate torque to a hybrid optimization module 220. The hybrid optimization module 220 determines how much torque should be produced by the engine 102 and how much torque should be produced by the electric motor 198. The hybrid optimization module 220 then outputs modified predicted and immediate torque values to the propulsion torque arbitration module 218. In various implementations, the hybrid optimization module 220 may be implemented in the hybrid control module 196.

The propulsion torque arbitration module 218 arbitrates the received predicted and immediate torques with propulsion torque requests. Propulsion torque requests may include, for example, torque reductions for engine over-speed protection and torque increases for stall prevention.

An actuation mode module 222 receives the predicted torque and the immediate torque from the propulsion torque arbitration module 218. Based on a mode setting, the actuation mode module 222 determines how the predicted and immediate torques will be achieved. The actuation mode module 222 transmits the predicted and immediate torques to be achieved to a predicted torque control module 224 and an immediate torque control module 226, respectively.

The predicted torque control module 224 determines desired engine parameters based on the predicted torque. For example only, the predicted torque control module 224 may determine a desired manifold absolute pressure (MAP), a desired throttle area, and/or a desired air per cylinder (APC) based on the predicted torque.

The immediate torque control module 226 determines a desired spark advance based on the immediate torque. For example, the desired spark advance may be determined with respect to a predetermined spark timing, such as a spark timing calibrated to produce a greatest amount of torque. The spark actuator module 126 controls the spark timing based on this desired spark advance.

A boost scheduling module 228 controls the boost actuator module 162 based on the desired MAP, and the boost actuator module 162 controls the boost device. The throttle actuator module 116 controls the opening of the throttle valve 112 based on the desired throttle area. A phaser scheduling module 230 generates intake and exhaust phaser commands based on the desired APC. The phaser scheduling module 230 may generate the intake and exhaust phaser commands further based on other engine parameters, such as the engine speed. The phaser actuator module 158 controls the intake and exhaust cam phasers 148 and 150 based on the commands.

A torque estimation module 232 determines an estimated torque output of the engine 102. The torque estimation module 232 may determine the estimated torque based on the APC, the spark advance, the MAF, and/or any other suitable parameter. The estimated torque may be defined as the amount of torque that could immediately be produced under the current airflow conditions by setting the spark advance to a calibrated value. This value may be calibrated based on a spark advance at which the engine 102 can produce the greatest amount of torque at the engine speed and APC.

The estimated torque may be transmitted to the predicted torque control module 224 and/or the immediate torque control module 226. The predicted and immediate torque control modules 226 may adjust the respective desired parameters based on the estimated torque.

The torque estimation module 232 according to the present application includes an APC security module (APCSM) 300 (See FIG. 3) that determines a first APC and a second APC. The first and second APCs may be referred to as $APC_1$ and $APC_2$, respectively. The APC security module 300 determines an APC threshold based on the operating conditions at the time when the first and second APCs are calculated.

Figure 3:
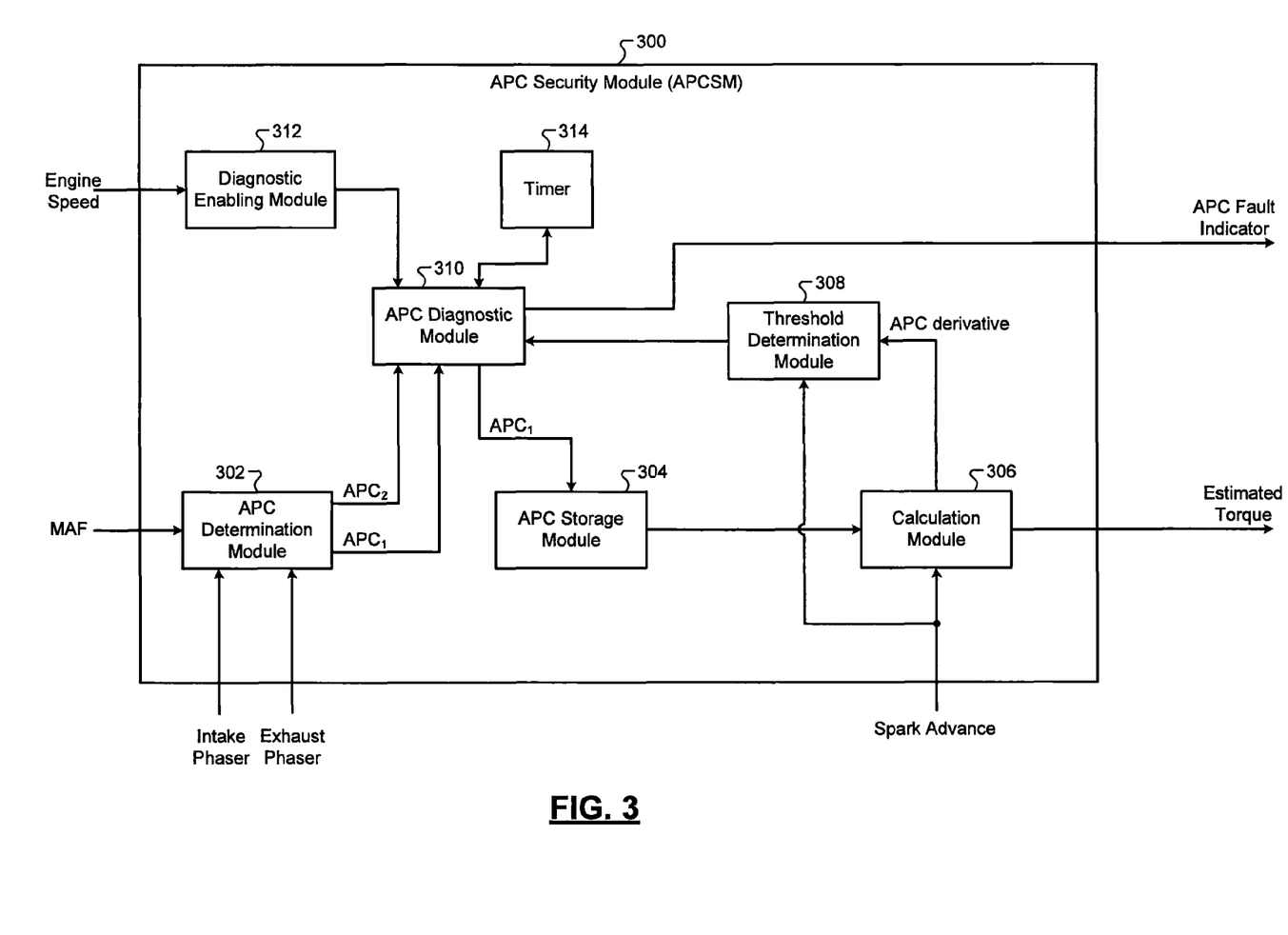
FIG. 3 is a functional block diagram of an exemplary APC security module according to the principles of the present disclosure.

APC security module 300 selectively diagnoses occurrence of a fault based on the first and second APCs and the APC threshold. The fault may be attributable to, for example, calculation of the first and/or second APCs. While the APC security module 300 is shown and will be discussed as being within the torque estimation module 232, the APC security module 300 may be implemented in any suitable location and may be external to the torque estimation module 232.

Referring now to FIG. 3, a functional block diagram of an exemplary implementation of the APC security module (APCSM) 300 is presented. The APC security module 300 includes an APC determination module 302, an APC storage module 304, a calculation module 306, and an APC threshold determination module 308. The APC security module 300 also includes an APC diagnostic module 310 and a diagnostic enabling module 312.

The ECM 114 commands the firing events of the respective cylinders of the engine 102 in a predetermined order. The order in which the cylinders are fired may be referred to as a firing order. The APC determination module 302 determines a first APC ($APC_1$) and a second APC ($APC_2$) based on the MAF measured by the MAF sensor 186. The first and second APCs may also be determined based on the intake and exhaust phaser angles, the RPM, the MAP, and/or any other suitable parameter. The APC determination module 302 calculates and outputs the pair of APCs (i.e., one first and one second APC) at a predetermined rate, such as once every firing event.

The first APC corresponds to an estimated amount of air that will be within the next cylinder in the firing order when that cylinder is fired. The second APC corresponds to an estimated amount of air that will be within the cylinder that is after the next cylinder in the firing order when that cylinder is fired. In other words, the second APC corresponds to an estimated amount of air that will be within the cylinder after next.

The APC storage module 304 includes memory, such as volatile memory (e.g., random access memory). The APC storage module 304 receives the first APC and stores the first APC in a predetermined location. Various vehicle systems or modules, such as the ECM 114, read the first APC from the APC storage module 304 and may make control decisions based on the first APC. For example, the first APC is used in calculating the estimated torque. Airflow, spark timing, and/or other parameters may be adjusted based on the estimated torque. Accordingly, verifying the validity and accuracy of the first APC ensures efficient engine operation and increases system stability.

The calculation module 306 calculates the estimated torque based on the first APC. The calculation module 306 may also calculate the estimated torque based on other operating conditions, such as the spark timing. For example only, the calculation module 306 may calculate the estimated torque using the equation:

$$T = a_1*APC + a_2*APC^2 + a_3*SPK + a_4*SPK^2 + a_5*SPK*APC + a_6*SPK^2*APC + a_7, \quad (1)$$

where T is the estimated torque, $a_1$-$a_7$ are torque coefficients calibrated for the engine 102, SPK is the current spark timing (advance), and APC is the first APC. Further discussion of torque estimation can be found in commonly assigned U.S. Pat. No. 6,704,638 entitled "Torque Estimator for Engine RPM and Torque Control," the disclosure of which is incorporated herein by reference in its entirety.

The calculation module 306 also calculates an APC derivative value. The APC derivative value corresponds to a partial derivative of the estimated torque with respect to APC (dT/dAPC). For example only, and assuming that all variables of equation (1) are independent of APC, the calculation module 306 may calculate the APC derivative value using the equation:

$$dT/dAPC = a_1 + a_2*APC^2 + a_5*SPK + a_6*SPK \quad (2)$$

where dT/dAPC is the APC derivative value, APC is the first APC, SPK is the spark timing, and $a_1$-$a_6$ are the torque coefficients.

The APC threshold determination module 308 determines an APC threshold based on the APC derivative value and a predetermined torque. The APC threshold corresponds to a change in APC that would result in an observable change in torque output by the engine 102 under the current operating conditions. The APC threshold is dynamic and changes with the operating conditions. For example only, the APC threshold may be determined using the equation:

$$APC\ Threshold = \frac{Predetermined\ Torque}{APC\ Derivative\ Value}. \quad (3)$$

The predetermined torque may be calibratable and may be set based on, for example, a change in torque output by the engine 102 that may be observable by the driver of the vehicle.

The diagnostic enabling module 312 selectively enables and disables the APC diagnostic module 310 based on the engine speed. For example only, the diagnostic enabling module 312 enables the APC diagnostic module 310 when the engine speed is greater than a predetermined speed. The predetermined speed may be calibratable and may be set to, for example, 500.0 rpm.

When enabled, the APC diagnostic module 310 determines the difference between the first and second APCs. The APC diagnostic module 310 determines the difference between the first and second APCs based on the first APC subtracted from the second APC. In other words, the APC diagnostic module 310 determines the difference between the first and second APCs using the equation:

$$Difference = APC_2 - APC_1, \quad (4)$$

where Difference is the difference between the first and second APCs, and $APC_1$ and $APC_2$ are the first and second APCs, respectively.

The APC diagnostic module 310 increments or decrements a counter or timer, such as timer 314, based on a comparison of the difference between the first and second APCs and the APC threshold. For example, the APC diagnostic module 310 increments the timer 314 when the difference between the first and second APCs is greater than the APC threshold. In other words, the APC diagnostic module 310 increments the timer 314 when the second APC is greater than the sum of the first APC and the APC threshold. Otherwise, the APC diagnostic module 310 may decrement the timer 314.

The APC diagnostic module 310 provides the first APC to the APC storage module 304 for storage. However, the APC diagnostic module 310 may limit the first APC before providing the first APC to the APC storage module 304. More specifically, the APC diagnostic module 310 selectively limits the first APC provided based on a comparison of the timer 314 with a first period of time.

For example, the APC diagnostic module 310 may limit the first APC when the timer 314 is greater than or equal to the first period of time. When an engine transient occurs, such as deactivation of one or more cylinders, the first and second APCs may deviate by more than the APC threshold. The first period may be calibratable and may be set based on a period necessary for the first and second APCs to converge after such an engine transient. For example only, the first period may be set to 100.0 ms.

The APC diagnostic module 310 may limit the first APC in any suitable manner. The APC diagnostic module 310 may limit the first APC provided to the APC storage module 304 based on, for example, the second APC and the APC threshold. For example only, the APC diagnostic module 310 may limit the first APC using the equation:

$$APC_1 = APC_2 - APC \text{ threshold}, \quad (5)$$

where $APC_1$ and $APC_2$ are the first and second APCs, respectively.

The APC diagnostic module 310 selectively diagnoses fault in the APC determination module 302 based on a comparison of the timer 314 with a second period of time. The APC diagnostic module 310 generates an APC fault indicator (e.g., signal) based on the diagnosis. For example only, the APC diagnostic module 310 diagnoses fault when the timer 314 is greater than or equal to the second period. The second period may be calibratable and may be set to, for example, approximately 175.0 ms or 200.0 ms. For example only, the second period may be set on a maximum amount of time after which the driver may perceive a change in torque output by the engine 102.

In various implementations, the APC diagnostic module 310 waits to diagnose fault in the APC determination module 302 until the timer 314 is greater than the first period. Remedial action may also be taken when a fault is diagnosed. For example only, remedial action may include reducing the torque output of the engine 102 and/or illuminating an indicator, such as a "check engine" light.

Figure 4:
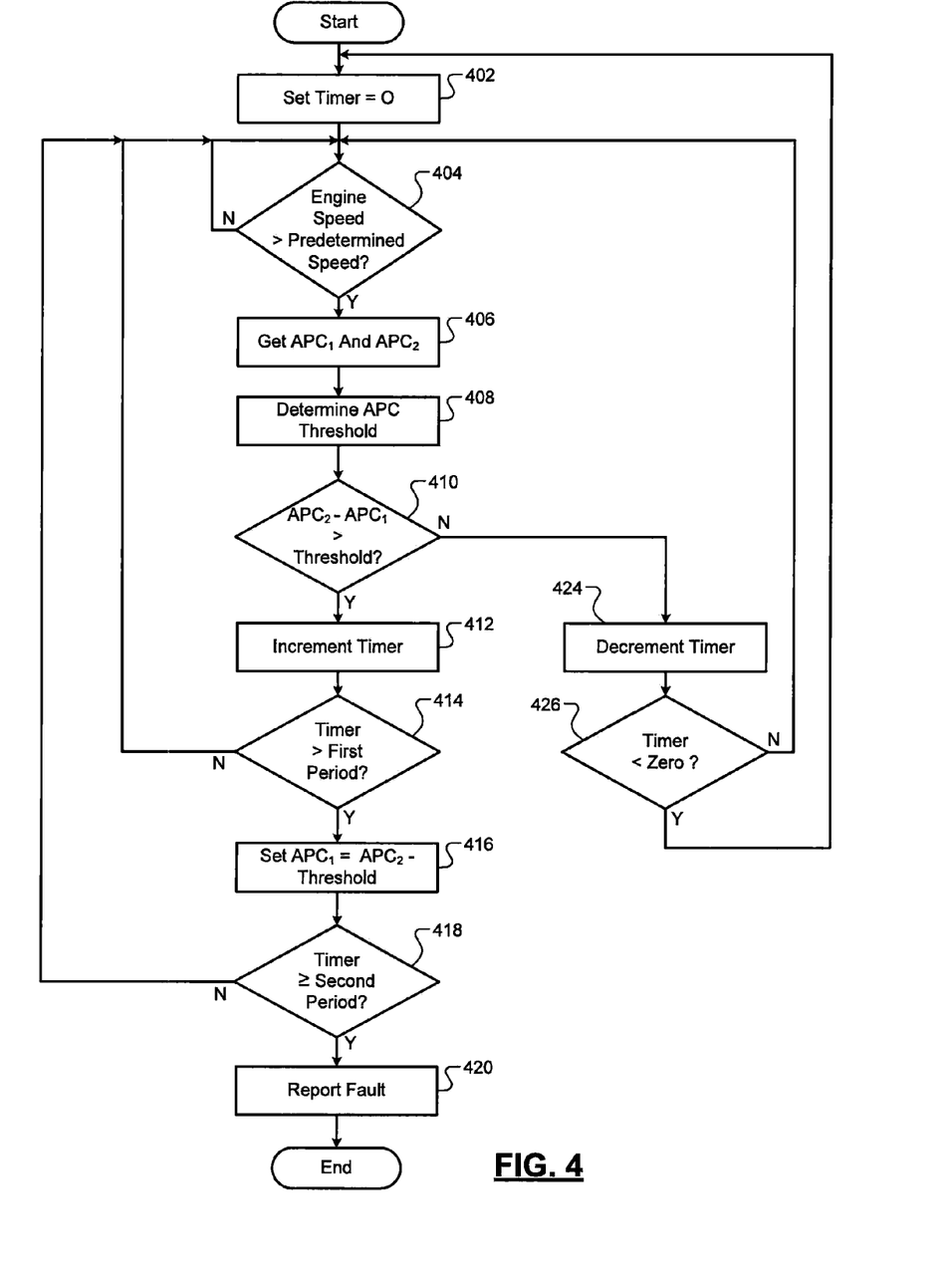
FIG. 4 is a flowchart depicting exemplary steps performed by an APC security module according to the principles of the present disclosure.

Referring now to FIG. 4, a flowchart depicting exemplary steps performed by the APC security module 300 is presented. Control begins in step 402 where control sets the timer to a predetermined reset value, such as zero (0.0). Control proceeds to step 404 where control determines whether the engine speed is greater than a predetermined speed. If true, control proceeds to step 406; otherwise, control remains in step 404. For example only, the predetermined speed may be set to 500.0 rpm.

In step 406, control gets the first APC ($APC_1$) and the second APC ($APC_2$). The first APC corresponds to an estimated amount of air that will be within the next cylinder in the firing order when that cylinder is fired. The second APC corresponds to an estimated amount of air that will be within the cylinder that is after the next cylinder in the firing order when that cylinder is fired. In step 408, control determines the APC threshold. The APC threshold may be determined using equation (3), above.

Control proceeds to step 410 where control determines whether the difference between the first and second APCs is greater than the APC threshold. In other words, control determines whether the second APC is greater than a sum of the first APC and the APC threshold in step 410. If so, control continues to step 412; otherwise, control transfers to step 424.

In step 412, control increments the timer. In this manner, control increments the timer when the second APC is greater than the sum of the first APC and the APC threshold. Control continues in step 414, where control determines whether the timer is greater than the first period. If true, control proceeds to step 416; otherwise, control returns to step 404. For example only, the first period may be set to 100.0 ms.

In step 416, control limits the first APC and sets the first APC in the APC storage module 304. In this manner, control limits the first APC when the timer exceeds the first period. Control may limit the first APC based on the second APC and the APC threshold. For example only, control may set the first APC using equation (5), above.

Control continues in step 418 where control determines whether the timer is greater than or equal to the second period. If true, control proceeds to step 420; otherwise, control returns to step 404. For example only, the second period may be set to 200.0 ms. In step 420, control diagnoses and reports a fault and control ends. In this manner, control reports a fault when the timer exceeds the second period. When the fault is reported, remedial action may also be taken, such as reducing the torque output of the engine 102.

Referring back to step 424 (i.e., when the difference between the first and second APCs is less than or equal to the APC threshold), control decrements the timer. Accordingly, control either decrements the timer or increments the timer based on whether the difference between the first and second APCs is greater than the APC threshold. If so, control increments the timer; otherwise, control decrements the timer. In step 426, control determines whether the timer is less than zero (0.0 s). If so, control returns to step 402 where the timer is set to zero; otherwise, control returns to step 404. In other words, control limits the timer to zero.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. An air-per-cylinder (APC) security system for a vehicle, comprising:
   an APC determination module that determines first and second APC values for first and second cylinders of an engine, respectively, based on mass airflow (MAF) into said engine;
   an APC threshold determination module that determines an APC threshold based on said first APC value and a spark timing for said first cylinder; and
   an APC diagnostic module that selectively diagnoses a fault in said APC determination module when said second APC value is greater than a sum of said first APC value and said APC threshold.

2. The APC security system of claim 1 wherein said first cylinder is a next cylinder to be fired in a firing order and said second cylinder is to be fired after said first cylinder.

3. The APC security system of claim 1 wherein said APC threshold determination module determines said APC threshold further based on a derivative of an estimated torque output of said engine with respect to APC.

4. The APC security system of claim 1 wherein said APC diagnostic module increments a timer when said second APC value is greater than said sum.

5. The APC security system of claim 4 further comprising an APC storage module, wherein said APC diagnostic module sets said first APC value in at least one predetermined location in said APC storage module.

6. The APC security system of claim 5 wherein said APC diagnostic module limits said first APC value before setting said first APC value in said APC storage module when said timer is greater than a first period.

7. The APC security system of claim 6 wherein said APC diagnostic module limits said first APC value based on said second APC value.

8. The APC security system of claim 6 wherein said APC diagnostic module diagnoses said fault when said timer is greater than a second period, wherein said second period is greater than said first period.

9. The APC security system of claim 4 wherein said APC diagnostic module decrements said timer when said second APC value is less than or equal to said sum.

10. The APC security system of claim 1 further comprising a diagnostic enabling module that one of enables and disables said APC diagnostic module based on an engine speed.

11. The APC security system of claim 10 wherein said diagnostic enabling module disables said APC diagnostic module when said engine speed is less than a speed threshold.

12. A method for an air-per-cylinder (APC) system of a vehicle, the method comprising:
- determining first and second APC values for first and second cylinders of an engine, respectively, based on mass airflow (MAF) into said engine;
- determining an APC threshold based on said first APC value and a spark timing for said first cylinder; and
- selectively diagnosing a fault in said first APC value when said second APC value is greater than a sum of said first APC value and said APC threshold.

13. The method of claim 12 wherein said first cylinder is a next cylinder to be fired in a firing order and said second cylinder is to be fired after said first cylinder.

14. The method of claim 12 further comprising determining said APC threshold further based on a derivative of an estimated torque output of said engine with respect to APC.

15. The method of claim 12 further comprising incrementing a timer when said second APC value is greater than said sum.

16. The method of claim 15 further comprising setting said first APC value in at least one predetermined location.

17. The method of claim 16 further comprising limiting said first APC value before said setting when said timer is greater than a first period.

18. The method of claim 17 wherein said limiting comprises limiting said first APC value based on said second APC value.

19. The method of claim 17 wherein said selectively diagnosing comprises diagnosing said fault when said timer is greater than a second period, wherein said second period is greater than said first period.

20. The method of claim 15 further comprising decrementing said timer when said second APC value is less than or equal to said sum.

21. The method of claim 12 further comprising one of enabling and disabling said diagnosing based on an engine speed.

22. The method of claim 21 wherein said one of enabling and disabling comprises disabling said diagnosing when said engine speed is less than a speed threshold.

* * * * *